F. H. CRANE & C. A. KING.
POWER TRANSMISSION AND REVERSING GEARING.
APPLICATION FILED MAY 7, 1908.
937,771.
Patented Oct. 26, 1909.
3 SHEETS—SHEET 1.
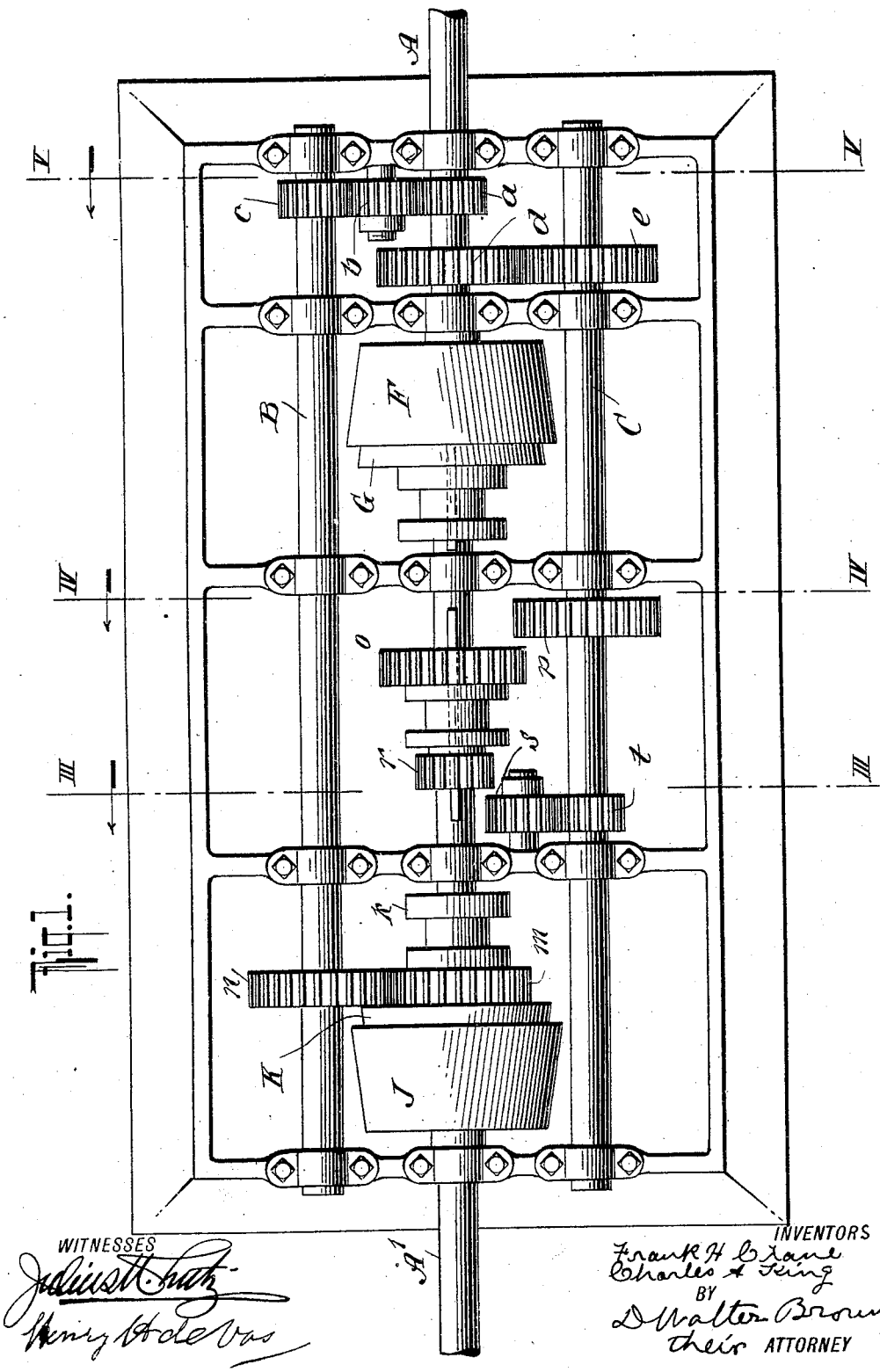

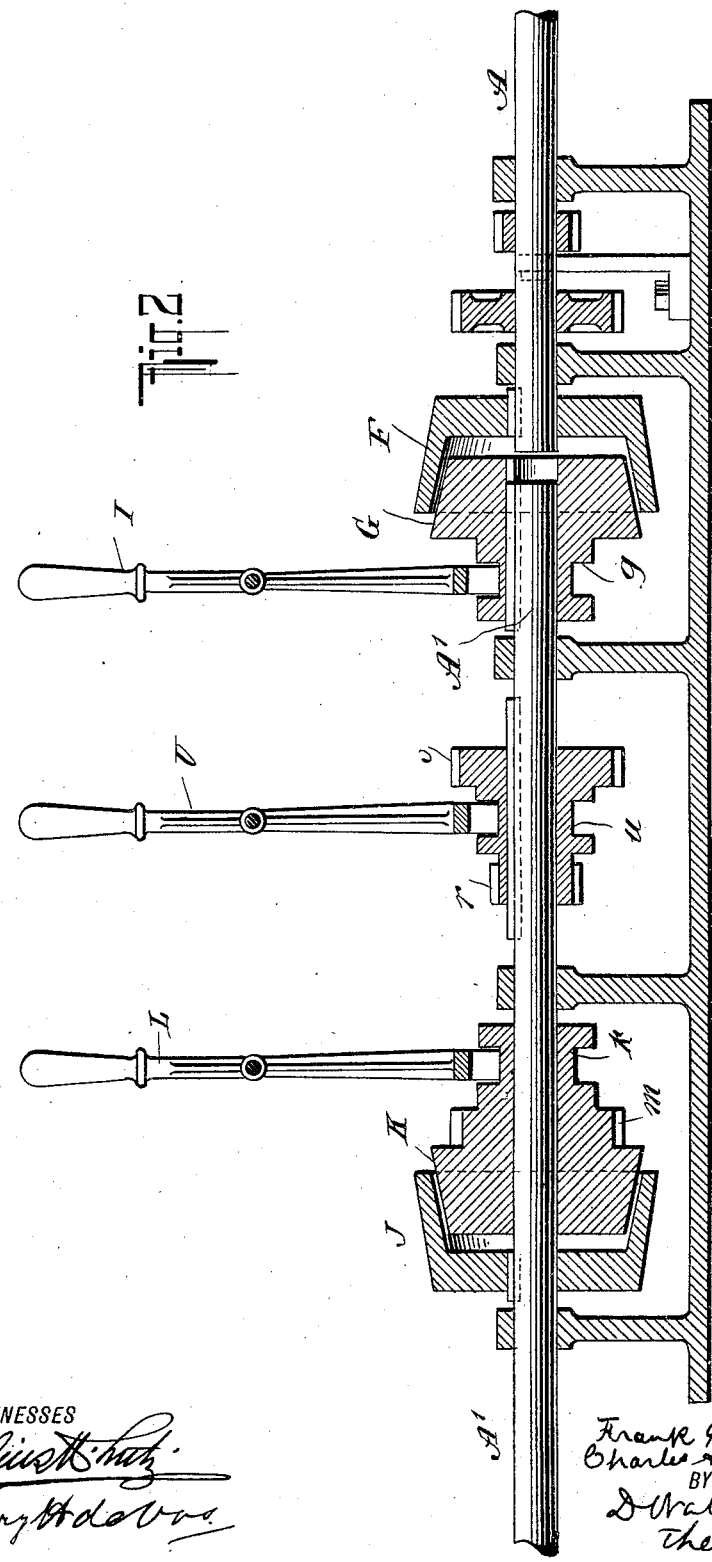

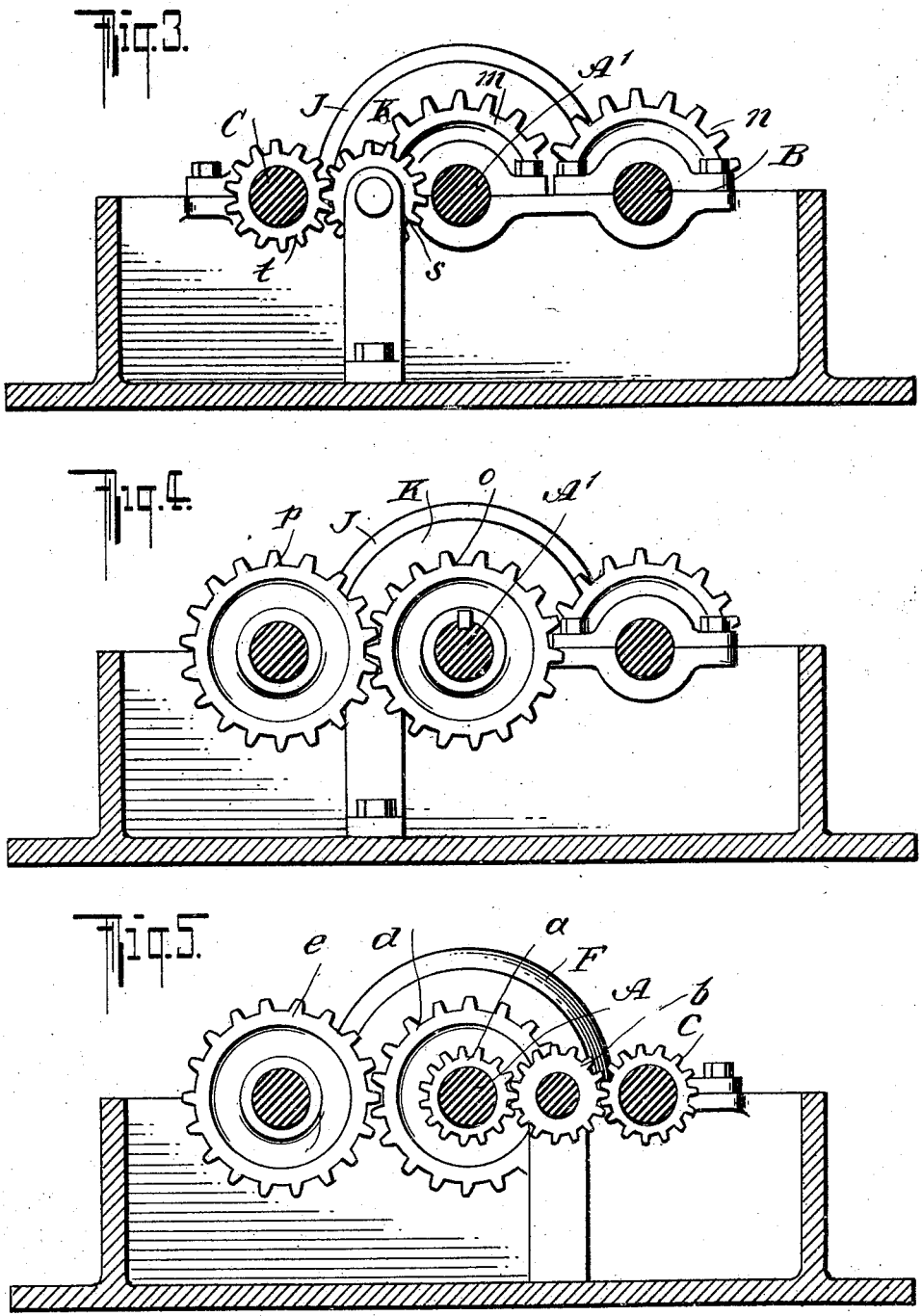

UNITED STATES PATENT OFFICE.

FRANK H. CRANE, OF NEW YORK, N. Y., AND CHARLES A. KING, OF JERSEY CITY, NEW JERSEY.

POWER-TRANSMISSION AND REVERSING GEARING.

937,771.  Specification of Letters Patent.  Patented Oct. 26, 1909.

Application filed May 7, 1908. Serial No. 431,327.

*To all whom it may concern:*

Be it known that we, FRANK H. CRANE and CHARLES A. KING, each being a citizen of the United States of America, and residents, respectively, of the borough of Brooklyn, city of New York, State of New York, and the city of Jersey City, in the State of New Jersey, have invented certain new and useful Improvements in Power - Transmission and Reversing Gearing, of which the following is a specification.

This invention relates to improvements in power-transmission and reversing gearing.

It is the purpose of the invention to provide means for driving an intermittently revolving shaft from a constantly revolving driving shaft, in such a manner that the driven shaft will be driven positively and without slip either in the same direction as the driving shaft or in the reverse direction thereto, and so that the driven shaft may be connected with the constantly revolving driving shaft or with a member driven therefrom, without danger of stripping the teeth of the gears in the driving train and without stopping the driving shaft; and the invention is especially adapted to use with the high-speed shafts of the motors of power driven carriages and motor boats, but its use is not limited thereto.

Heretofore it has been very difficult to obtain a satisfactory direct and reverse drive of a driven shaft from a high speed driving shaft, without stopping the latter. For, on the one hand, when the gearing has been relied on to drive the driven shaft, there has been liability of stripping the teeth of the driving gear train, and upon the other hand, when friction clutches have been employed to drive the driven shaft, an injurious slip has resulted. But our invention permits us to use positive non-stripping gear trains as the agency for driving the driven shaft both in the same direction as and in the reverse direction from the driving shaft, without stopping the latter, and to stop, start and reverse the driven shaft without any liability of stripping the gear teeth.

The invention is equally applicable to the case when the driving and the driven shafts revolve at the same speed and to the case when they revolve at different speeds, but for the sake of simplicity of illustration and description, the accompanying drawings illustrate and the specification hereinafter describes that form of the invention in which said shafts both revolve at the same speed.

Referring to the said drawings to aid the description, Figure 1 is a plan of apparatus embodying the invention; Fig. 2 is a section and elevation in the plane of the driving and driven shafts. Figs. 3, 4 and 5 are transverse sectional elevations taken respectively on the planes of the lines III—III; the lines IV—IV, and the lines V—V of Fig. 1.

The driving shaft A is driven from any suitable motor, not shown, and is a constantly running shaft and A' is the intermittently running driven shaft in line with said shaft A. B is a counter shaft connected with shaft A by a gear train, as $a, b, c$, so as to revolve at the same speed and in the same direction as said shaft A. C is a counter shaft connected with said shaft A by a gear train, as $d, e$, so as to revolve in the reverse direction from said shaft A. F is a member of a clutch, and preferably the female member of a conical friction clutch, fixed on said shaft A, and G is a corresponding member of said clutch, preferably a male member of a friction clutch, sliding on and turning with said driven shaft A', and the shouldered collar $g$ of said clutch member G is engaged in the usual manner by the shifting lever, or "shipper" I, which is suitably pivoted on the frame. Said driven shaft A' is also provided with a member of a clutch J fixed thereon, and preferably the female member of a conical friction clutch, and centered on but turning loosely on said shaft A' is the coöperating member of a clutch K, which is preferably the male member of the conical friction clutch, and the shouldered collar $r$ of said member K is engaged by the pivoted shipper L in the usual manner. A gear $m$, integral with or firmly secured to said clutch member K, meshes with a gear $n$ of the same size fixed on counter shaft B, so that said shaft B and said clutch member K revolve in opposite directions. Sliding on and turning with said shaft A' is a gear $o$ arranged to mesh when desired with a gear $p$ fixed on said shaft C, so that when gears $o, p$ are in mesh shafts A' and C will revolve in opposite directions at the same speed; and sliding on and turning with said shaft A' is another gear $r$ arranged to mesh when desired with a gear $s$ meshing with a gear $t$ fixed on said shaft C, so that when said gear $r$ is in mesh with said gear *s* shafts A′ and C will revolve in the same direction at the same speed; and we prefer to form said gears *o*, *r*, integral with, or to firmly secure said gears to, each other, and to provide a single collar *u* engaged by a shipper U so that said shipper may shift both said gears, *o*, *r*, simultaneously. In one position said gear *o* will mesh with said gear *p*, said gear *r* then being disconnected from said gear *s*; in another position said gear *r* will mesh with said gear *s*, said gear *o* being then disconnected from said gear *p*; and in a third position said gears *o*, *r* will be disconnected from both said gears *p* and *s*, and as seen in Fig. 1.

The operation is as follows: When the clutch members F G and J K, are disconnected and the gears *o*, *r* are in the position of Fig. 1, driven shaft A′ will be at rest, since the motion of the constantly running shaft A will then not be communicated to said shaft A′ from either counter shaft B or counter shaft C. Now to drive shaft A′ in the same direction as shaft A, clutch member G is shifted into engagement with clutch member F, clutch members J, K remaining disconnected, and said clutch members F, G now drive shaft A′ in the same direction at the same speed as shaft A is revolving. Gear *o* is next shifted to mesh with gear *p* and, as its pitch line speed is the same and in the same direction, it slips readily into mesh with said gear *p* without any danger of stripping the teeth of either gear. Now clutch member G is slacked off clutch member F, and shaft A′ is positively driven by gears *o*, *p* from counter shaft C in the same direction at the same speed as shaft A is revolving. To reverse shaft A′ the gears *o*, *r* are shifted to the position of Fig. 1, and then clutch member K is shifted into engagement with clutch member J, the teeth on gears *m*, *n* being long enough to permit of such motion of clutch member K without disconnecting said gears *m*, *n*. Now shaft A′ is driven by said clutch members J, K in the opposite direction from and at the same speed as shaft A. Next gears *o*, *r* are shifted to mesh gear *r* with gear *s*, and, since said pitch line speed of said gears *r*, *s* is the same and in the same direction, gear *r* slips into mesh with gear *s*, without any danger of stripping the teeth of either gear. Next clutch member K is slacked off clutch member J and shaft A′ continues to be driven in the direction reverse to the revolution of shaft A by the gears *r*, *s*, *t*. Said shippers, I, U, L, or any two of them may manifestly be connected together so as to operate in proper relation to each other simultaneously or in determined order.

Manifestly, as hereinbefore stated, the invention can be readily arranged so that shaft A′ can be driven at different speeds from shaft A, and either in the same as or the reverse direction to said shaft A.

Now having described our improvements, we claim as our invention.

1. The combination of a constantly running shaft, a driven shaft, a clutch for temporarily driving said driven shaft and adapted to be engaged and disengaged without stopping said driving shaft, and gearing adapted to be engaged and operatively connect said shafts while said clutch is engaged and to remain in engagement after said clutch is disengaged.

2. The combination of a constantly running driving shaft, a counter shaft driven thereby, a driven shaft, a clutch temporarily connecting said driving and driven shafts, and gears on said counter shaft and on said driven shaft adapted to be operatively connected while said clutch is connected and to remain connected after said clutches are disconnected, substantially as described.

3. The combination of a driving shaft, a driven shaft, a clutch for driving said driven shaft temporarily in the same direction as the driving shaft, a counter shaft and gearing adapted to drive said driven shaft in the same direction as or the reverse direction from said driving shaft, a clutch for temporarily driving said driven shaft in the reverse direction from said driving shaft, and gearing for driving a member of said clutch, substantially as described.

4. The combination of a driving shaft, a driven shaft, a clutch for driving said shaft temporarily in the same direction as the driving shaft, a counter shaft and gearing adapted to drive said driven shaft in the same direction as or the reverse direction from said driving shaft, a clutch for temporarily driving said driven shaft in the reverse direction from said driving shaft, a counter shaft and gearing adapted to drive a member of said clutch in the reverse direction from said driving shaft, substantially as described.

5. The combination of a driving shaft, a driven shaft, a clutch adapted to drive said driven shaft from and in the same direction as said driving shaft, a clutch adapted to drive said driven shaft in the reverse direction from said driving shaft, gearing for driving a member of said last named clutch, and gears adapted to drive said driven shaft, when said clutches are disconnected, in the same direction as or the reverse direction to said driving shaft, substantially as described.

6. The combination of a constantly running driving shaft, a counter-shaft and gearing for driving the same in the reverse direction from said driving shaft, another counter-shaft and gearing for driving the same in the same direction as said driving shaft, a driven shaft, a clutch for driving said driven shaft in the reverse direction from said driving shaft, gearing for driving a member of said clutch from said last named counter-shaft in the reverse direction from said driving shaft, and gearing for driving said driven shaft from said first named counter-shaft and in the reverse direction from said driving shaft when said clutch is disconnected, substantially as described.

7. The combination of a constantly running driving shaft A, a driven shaft A', a counter-shaft B, a gear train for driving said counter-shaft B from and in the same direction as said driving shaft A, clutch members F, G adapted to drive said driven shaft A' from and in the same direction as said driving shaft A, a counter-shaft C a gear train for driving said counter-shaft C from and in the reverse direction from said driving shaft A, clutch members J, K for driving said driven shaft A' in the reverse direction from said driving shaft A, a gear train operatively connecting clutch member K with said counter-shaft B, and gear trains for driving said driven shaft A' from said counter-shaft C in the same direction as and in reverse direction from said driving shaft A, substantially as described.

Signed at New York city this 25th day of April 1908.

FRANK H. CRANE.
CHAS. A. KING.

Witnesses:
 GEO. W. McKENZIE,
 FRED L. GROSS.